(12) United States Patent
Shoji et al.

(10) Patent No.: US 10,744,821 B2
(45) Date of Patent: Aug. 18, 2020

(54) NON-PNEUMATIC TIRE

(71) Applicant: BRIDGESTONE CORPORATION, Tokyo (JP)

(72) Inventors: Takanori Shoji, Tokyo (JP); Akihiko Abe, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/123,784

(22) PCT Filed: Mar. 13, 2015

(86) PCT No.: PCT/JP2015/057474
§ 371 (c)(1),
(2) Date: Sep. 6, 2016

(87) PCT Pub. No.: WO2015/141579
PCT Pub. Date: Sep. 24, 2015

(65) Prior Publication Data
US 2017/0015141 A1    Jan. 19, 2017

(30) Foreign Application Priority Data

Mar. 17, 2014   (JP) .................................. 2014-053571

(51) Int. Cl.
*B60C 7/24* (2006.01)
*B60C 7/20* (2006.01)
(Continued)

(52) U.S. Cl.
CPC .................. *B60C 7/24* (2013.01); *B60C 7/14* (2013.01); *B60C 7/18* (2013.01); *B60C 7/20* (2013.01); *B60C 2007/146* (2013.01)

(58) Field of Classification Search
CPC .. B60C 7/10; B60C 7/102; B60C 7/14; B60C 7/16; B60C 7/18; B60C 7/20; B60C 7/24; B60C 7/143; B60B 9/04; B60B 9/26
See application file for complete search history.

(56) References Cited

U.S. PATENT DOCUMENTS 1,617,870 A    2/1927  Snider
3,219,090 A   11/1965  Cislo
(Continued)

FOREIGN PATENT DOCUMENTS

CN       201931931 U     8/2011
CN       102795337 A    11/2012
(Continued)

OTHER PUBLICATIONS

Communication dated May 19, 2017 from the State Intellectual Property Office of the P.R.C., issued in counterpart application No. 201580013208.X.

*Primary Examiner* — Kip T Kotter
(74) *Attorney, Agent, or Firm* — Sughrue Mion, PLLC

(57) ABSTRACT

Provided is a non-pneumatic tire including an attachment body attached to an axle, an outer tubular body (13) configured to surround the attachment body from the outside in a tire radial direction, and a connecting member (15) configured to connect the attachment body and the outer tubular body while allowing displacement therebetween, wherein the connecting member includes a first elastic connecting plate (21) in which a first end portion (21*a*) connected to the outer tubular body is disposed closer to a first side in a tire circumferential direction than a second end portion connected to the attachment body and an intermediate portion (21*c*) is disposed between the first end portion and the second end portion, and both of circumferential end surface (26*a*, 26*b*) directed in the tire circumferential direction among surfaces of the first end portion of the first elastic (Continued)

connecting plate extend in opposite directions in the tire circumferential direction to be separated from each other from the inside toward the outside in the tire radial direction.

4 Claims, 6 Drawing Sheets

(51) Int. Cl.
    *B60C 7/18*         (2006.01)
    *B60C 7/14*         (2006.01)

(56) References Cited

U.S. PATENT DOCUMENTS

| | | |
|---|---|---|
| 4,037,635 A | 7/1977 | Ippen et al. |
| 4,168,771 A | 9/1979 | Krivec |
| 4,832,098 A | 5/1989 | Palinkas et al. |
| 4,921,029 A | 5/1990 | Palinkas et al. |
| 2011/0017377 A1 | 1/2011 | Albert et al. |
| 2012/0200149 A1 | 8/2012 | Rudakevych et al. |
| 2012/0305702 A1 | 12/2012 | Bucheton et al. |

FOREIGN PATENT DOCUMENTS

| | | | |
|---|---|---|---|
| CN | 103313832 A | | 9/2013 |
| EP | 0 399 383 A2 | | 11/1990 |
| EP | 3069897 A1 | | 9/2016 |
| JP | 2-310102 A | | 12/1990 |
| JP | 2008-132951 A | | 6/2008 |
| JP | 2009286208 A | * | 12/2009 |
| JP | 2013-86712 A | | 5/2013 |
| WO | 2008041927 A1 | | 4/2008 |
| WO | 2012/094005 A1 | | 7/2012 |

\* cited by examiner

NON-PNEUMATIC TIRE

CROSS REFERENCE TO RELATED APPLICATIONS

This application is a National Stage of International Application No. PCT/JP2015/057474, filed on Mar. 13, 2015, which claims priority from Japanese Patent Application No. 2014-053571, filed on Mar. 17, 2014, the contents of all of which are incorporated herein by reference in their entirety.

TECHNICAL FIELD

The present invention relates to a non-pneumatic tire that can be used without being filled with pressurized air.

Priority is claimed on Japanese Patent Application No. 2014-53571, filed Mar. 17, 2014, the content of which is incorporated herein by reference.

BACKGROUND ART

In a pneumatic tire of the related art that is filled with pressurized air and used, occurrence of a blowout is a structurally unavoidable problem.

In order to solve this problem, in recent years, for example, as disclosed in the following Patent Document 1, a non-pneumatic tire including an attachment body attached to an axle, an outer tubular body configured to surround the attachment body from the outside in a tire radial direction, and connecting members configured to connect the attachment body and the outer tubular body while allowing displacement therebetween has been proposed.

In addition, in the non-pneumatic tire, the connecting members include an elastic connecting plate having first end portion connected to the outer tubular body and the second end portion connected to the attachment body.

DOCUMENT OF RELATED ART

Patent Document

[Patent Document 1]
Japanese Unexamined Patent Application, First Publication No. 2013-86712

SUMMARY OF INVENTION

Technical Problem

However, in the non-pneumatic tire of the related art, when a compressive force is applied in the tire radial direction, stress may be locally concentrated on a connecting portion between a circumferential end surface directed in a tire circumferential direction in a surface of first end portion of the elastic connecting plate and the outer tubular body.

In consideration of the above-mentioned circumstances, the present invention is directed to provide a non-pneumatic tire capable of limiting local concentration of the stress on the connecting portion between the circumferential end surface of the first end portion of the elastic connecting plate and the outer tubular body and reducing deviation of ground pressure in a ground plane when a compressive force is applied in the tire radial direction.

Solution to Problem

There is provided a non-pneumatic tire of the present invention including an attachment body attached to an axle; an outer tubular body configured to surround the attachment body from the outside in the tire radial direction; and a connecting member configured to connect the attachment body and the outer tubular body while allowing displacement therebetween, wherein the connecting member comprises an elastic connecting plate in which first end portion connected to the outer tubular body is disposed closer to first side in a tire circumferential direction than the second end portion connected to the attachment body, and an intermediate portion is disposed between the first end portion and the second end portion, and both of circumferential end surfaces directed in the tire circumferential direction among surfaces of the first end portion of the elastic connecting plate extend in opposite directions in the tire circumferential direction to be separated from each other from the inside toward the outside in the tire radial direction.

According to the present invention, both of the circumferential end surfaces of the first end portion of the elastic connecting plate extend in opposite directions in the tire circumferential direction to be separated from each other from the inside toward the outside in the tire radial direction. For example, when a compressive force in the tire radial direction is applied to the non-pneumatic tire, stress generated in the connecting portion between the circumferential end surface of the first end portion and the outer tubular body can be easily distributed in the first end portion in the tire radial direction, and local concentration of stress on the connecting portion can be limited.

Accordingly, a ground pressure generated at a portion disposed immediately under the connecting portion can be reduced in the ground plane of the non-pneumatic tire, and deviation of the ground pressure in the ground plane can be reduced.

Accordingly, for example, damage to the connecting portion and generation of vibrations, uneven wear, or the like, can be limited.

Further, both of the circumferential end surfaces of the first end portion of the elastic connecting plate extend as described above. For this reason, as a connecting length in the tire circumferential direction between the first end portion of the elastic connecting plate and the outer tubular body is lengthily secured, the ground pressure generated in the portion disposed immediately under the first end portion of the elastic connecting plate can be distributed in the ground plane in the tire circumferential direction, and as described above, deviation of the ground pressure in the ground plane can be reliably reduced in cooperation with reduction in the ground pressure generated in the portion disposed immediately under the connecting portion.

In addition, since both of the circumferential end surfaces of the first end portion of the elastic connecting plate extend as described above, the first end portion can be limited from being deformed to collapse in the tire circumferential direction, and the above-mentioned effects can be reliably exhibited.

Further, the intermediate portion of the elastic connecting plate extends from the first side toward the second side in the tire circumferential direction as it goes from the outside toward the inside in the tire radial direction. For this reason, when a compressive force in the tire radial direction is applied to the non-pneumatic tire, the elastic connecting plate can be smoothly elastically deformed with, for example, difficulty in buckling distortion or the like.

Here, both of the circumferential end surfaces of the first end portion of the elastic connecting plate may have a curved concave shape recessed in the tire circumferential direction in a tire side view when the non-pneumatic tire is seen in the tire width direction.

In this case, both of the circumferential end surfaces of the first end portion of the elastic connecting plate have a curved concave shape recessed in the tire circumferential direction when seen in the tire side view. For this reason, when a compressive force in the tire radial direction is applied to the non-pneumatic tire, stress generated in the connecting portion between the circumferential end surface of the first end portion and the outer tubular body can be reliably distributed in the first end portion in the tire radial direction.

In addition, the connecting portion of the intermediate portion to the first end portion may have a curved shape protruding toward first side in the tire circumferential direction in the tire side view when the non-pneumatic tire is seen in the tire width direction.

In this case, the connecting portion has a curved shape protruding toward the first side in the tire circumferential direction when seen in the tire side view. For this reason, the intermediate portion extending from the first side toward the second side in the tire circumferential direction and the first end portion can be smoothly connected from the outside toward the inside in the tire radial direction. Accordingly, concentration of stress on the connecting portion can be limited, and the first end portion can be further prevented from being deformed to collapse in the tire circumferential direction.

In addition, the plurality of elastic connecting plates may be disposed at intervals in the tire circumferential direction, and a size in the tire circumferential direction of the first end portion of the elastic connecting plate on the inner circumferential surface of the outer tubular body may be larger than an interval between the first end portions of the elastic connecting plates neighboring in the tire circumferential direction on the inner circumferential surface of the outer tubular body.

In this case, the size in the tire circumferential direction of the first end portion of the elastic connecting plate on the inner circumferential surface of the outer tubular body is larger than the interval between the first end portions of the elastic connecting plates neighboring in the tire circumferential direction on the inner circumferential surface of the outer tubular body. For this reason, the ground pressure generated in the portion disposed immediately under the first end portion of the elastic connecting plate can be reliably distributed in the ground plane in the tire circumferential direction, and deviation of the ground pressure in the ground plane can be more reliably reduced.

In addition, a plurality of curved sections curved in the tire circumferential direction may be formed at the intermediate portion in an extension direction in which the elastic connecting plate extend in the tire side view when the non-pneumatic tire is seen in the tire width direction, and the curve directions of the curved sections neighboring in the extension direction may be opposite to each other.

In this case, the plurality of curved sections are formed at the intermediate portion. For this reason, flexibility can be provided in the elastic connecting plate, and damage to the elastic connecting plate can be limited.

Effects of Invention

According to the present invention, when the compressive force is applied in the tire radial direction, local concentration of stress on the connecting portion between the circumferential end surface of the first end portion of the elastic connecting plate and the outer tubular body can be limited, and deviation of the ground pressure in the ground plane can be reduced.

DESCRIPTION OF EMBODIMENT

Figure 1:
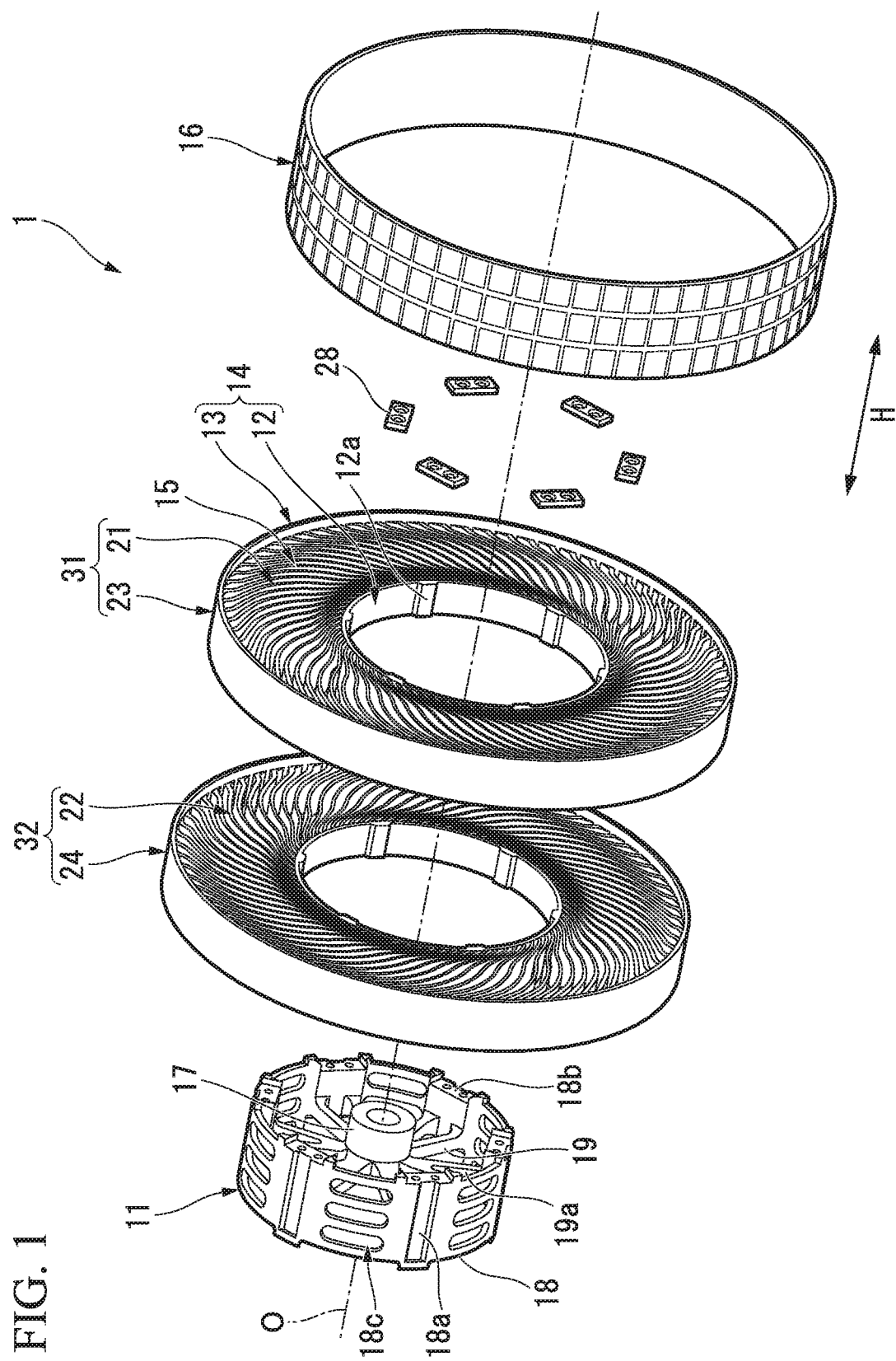
FIG. 1 is a schematic perspective view showing a non-pneumatic tire of an embodiment according to the present invention, a portion of which is exploded.

Hereinafter, an embodiment of a non-pneumatic tire according to the present invention will be described with reference to FIGS. 1 to 6.

A non-pneumatic tire 1 includes an attachment body 11 attached to an axle (not shown), a ring member 14 including an inner tubular body 12 installed outside the attachment body 11 and an outer tubular body 13 configured to surround the inner tubular body 12 from the outside in a tire radial direction, a plurality of connecting members 15 disposed between the inner tubular body 12 and the outer tubular body 13 in a tire circumferential direction and configured to connect the tubular bodies 12 and 13 to each other while allowing relative elastic displacement therebetween, and a tread member 16 disposed at an outer circumferential surface side of the outer tubular body 13 throughout the circumference.

Here, the attachment body 11, the inner tubular body 12, the outer tubular body 13 and the tread member 16 are disposed coaxially with a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner tubular body 12, the outer tubular body 13 and the tread member 16 are disposed such that central portions in the tire width direction H coincide with each other.

In the ring member 14, the outer tubular body 13 has a size in the tire width direction H, i.e., a width larger than that of the inner tubular body 12. In addition, a plurality of protrusions 12a protruding inward in the tire radial direction and extending throughout the length in the tire width direction H are disposed at an inner circumferential surface of the inner tubular body 12 at intervals in the tire circumferential direction.

The length in the tire circumferential direction of the protrusions 12a is gradually decreased from the outside toward the inside in the tire radial direction. Among the wall surfaces that define the protrusions 12a, the sidewall surfaces disposed at both sides in the tire circumferential direction and the top wall surfaces disposed at inner ends in the tire radial direction have flat surfaces throughout the region.

Figure 2:
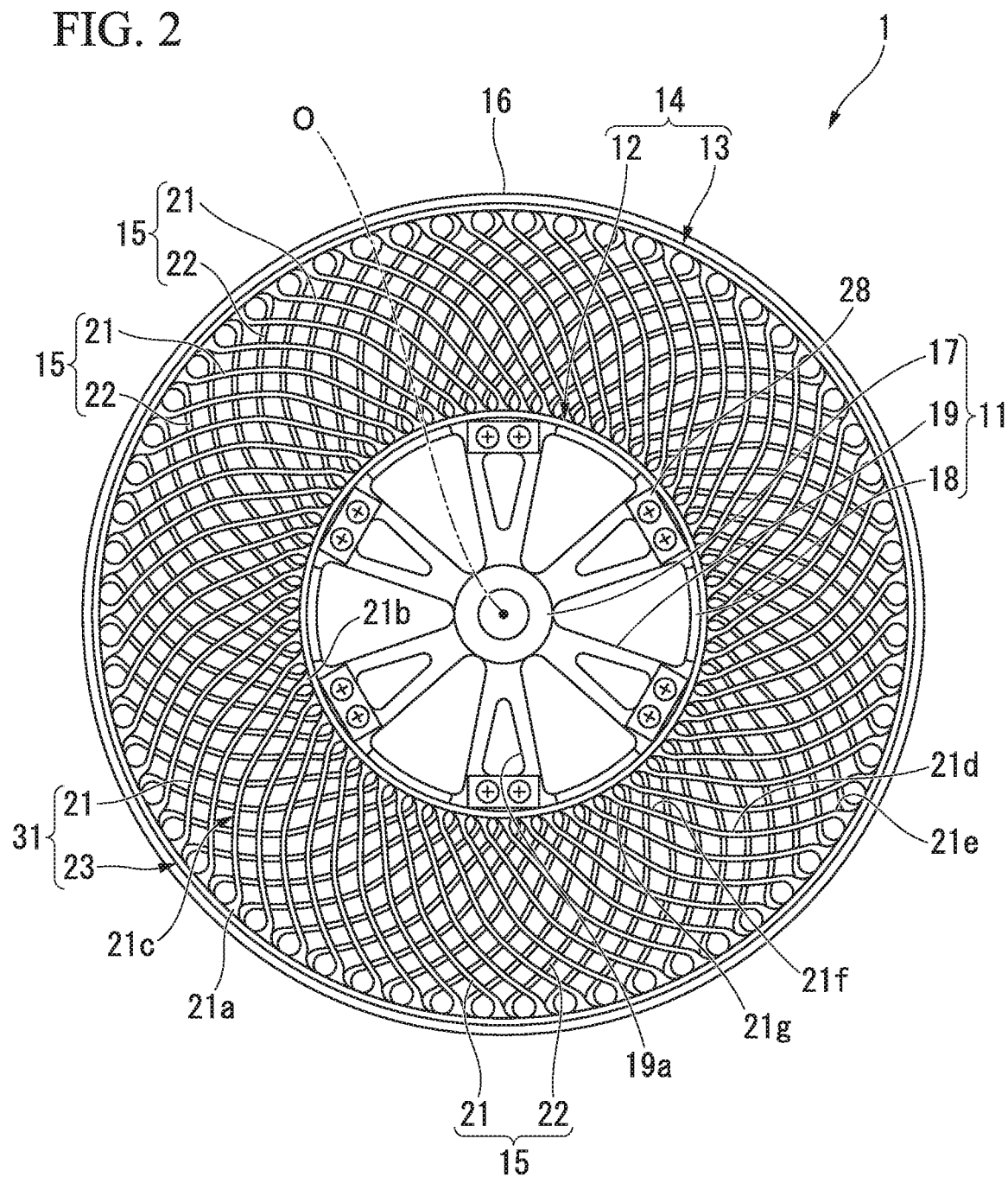
FIG. 2 is a side view of the non-pneumatic tire shown in FIG. 1, when seen from a first side in a tire width direction.

As shown in FIGS. 1 and 2, the attachment body 11 includes a tubular mounting portion 17 on which a distal end portion of the axle is mounted, an outer ring section 18 configured to surround the tubular mounting portion 17 from the outside in the tire radial direction, and a plurality of ribs 19 configured to connect the tubular mounting portion 17 and the outer ring section 18.

The tubular mounting portion 17, the outer ring section 18 and the ribs 19 are integrally formed of a metal material such as an aluminum alloy or the like. The tubular mounting portion 17 and the outer ring section 18 are formed in a tubular shape and disposed coaxially with the axis O. The plurality of ribs 19 are disposed at equal intervals in the circumferential direction.

A plurality of key groove sections 18a recessed inward in the tire radial direction and extending in the tire width direction H are formed in the outer circumferential surface of the outer ring section 18 at intervals in the tire circumferential direction. The key groove sections 18a are opened at one of both ends in the tire width direction H and closed at the other end in the outer circumferential surface of the outer ring section 18. The protrusions 12a of the inner tubular body 12 of the ring member 14 are fitted into the key groove sections 18a.

Further, an inner surface shape of each of the key groove sections 18a and an outer surface shape of each of the protrusions 12a have the same shape, and volumes of the key groove sections 18a and the protrusions 12a are also equal to each other. That is, a size in the tire circumferential direction of the key groove sections 18a is gradually reduced from the outside toward the inside in the tire radial direction, and among the wall surfaces that define the key groove sections 18a, the sidewall surfaces disposed at both sides in the tire circumferential direction and the bottom wall surfaces disposed at the inner ends in the tire radial direction are flat surfaces throughout the region.

Here, concave sections 18b recessed toward the second side in the tire width direction H and into which plate members 28 are fitted are formed in an edge of the first side in the tire width direction H of the outer ring section 18 at positions corresponding to the key groove sections 18a. Through-holes are formed in the plate members 28, and female screw sections in communication with the through-holes of the plate members 28 fitted into the concave sections 18b are formed in the wall surfaces directed to the first side in the tire width direction H among the wall surfaces that define the concave sections 18b. Further, the plurality of female screw sections and the plurality of through-holes are formed at intervals in the tire circumferential direction.

Then, in a state in which the inner tubular body 12 of the ring member 14 is fitted onto the attachment body 11 and the protrusions 12a are fitted into the key groove sections 18a, the ring member 14 is fixed to the attachment body 11 by threading bolts into the female screw sections through the through-holes of the plate members 28 fitted into the concave sections 18b. In this state, the protrusions 12a are sandwiched in the tire width direction H between the plate members 28 and the other end wall surfaces disposed at the other ends in the tire width direction H and directed toward the first sides, among the wall surfaces that define the key groove sections 18a.

Further, a plurality of hole arrays 18c in which a plurality of weight-reducing holes passing in the tire radial direction are disposed at intervals in the tire width direction H are disposed at intervals in the tire circumferential direction at portions of the outer ring section 18 disposed between the key groove sections 18a neighboring in the tire circumferential direction. In addition, weight-reducing holes 19a passing in the tire width direction H are also formed in the ribs 19.

The tread member 16 is formed in a tubular shape, and integrally coated on the outer circumferential surface side of the outer tubular body 13 of the ring member 14 throughout the region. The tread member 16 is formed of, for example, vulcanized rubber in which natural rubber or/and a rubber composition are vulcanized, a thermoplastic material, or the like. For example, a thermoplastic elastomer, a thermoplastic resin, or the like, is exemplified as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), another thermoplastic elastomer (TPZ), or the like, as defined in Japanese Industrial Standard JIS K6418, is exemplified as the thermoplastic elastomer. For example, a urethane resin, an olefin resin, polyvinyl chloride, a polyamide resin, or the like, is exemplified as the thermoplastic resin. Further, in view of abrasion resistance, the tread member 16 may be formed of vulcanized rubber.

The connecting members 15 connect the attachment body 11 and the outer tubular body 13 while allowing relative elastic displacement therebetween. The plurality of connecting members 15 are disposed at intervals in the tire circumferential direction. The connecting members 15 are connected to the attachment body 11 via the inner tubular body 12. The connecting members 15 connect the inner tubular body 12 and the outer tubular body 13 of the ring member 14 to each other, and include first elastic connecting plates 21 and second elastic connecting plates 22 disposed at different positions in the tire width direction H.

The plurality of connecting members 15 are formed in the tire circumferential direction such that the plurality of first elastic connecting plates 21 are disposed in the tire circumferential direction at predetermined positions in the tire width direction H and the plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same position in the tire width direction H, and the plurality of second elastic connecting plates 22 are disposed in the tire circumferential direction at the same predetermined positions in the tire width direction H separated from the first elastic connecting plates 21 in the tire width direction H.

Further, the plurality of connecting members 15 are disposed between the inner tubular body 12 and the outer tubular body 13 of the ring member 14 at positions axially symmetrical with reference to the axis O. In addition, all of the connecting members 15 have the same shape and the same size. Further, a width of each of the connecting members 15 is smaller than a width of the outer tubular body 13.

Additionally, the first elastic connecting plates 21 neighboring in the tire circumferential direction do not come in contact with each other, and the second elastic connecting plates 22 neighboring in the tire circumferential direction do not come in contact with each other. Further, the first elastic connecting plate 21 and the second elastic connecting plate 22 neighboring in the tire width direction H do not come in contact with each other.

Further, the widths of the first elastic connecting plate 21 and the second elastic connecting plate 22 are equal to each other. In addition, thicknesses of the first elastic connecting plate 21 and the second elastic connecting plate 22 are also equal to each other.

Figure 3:
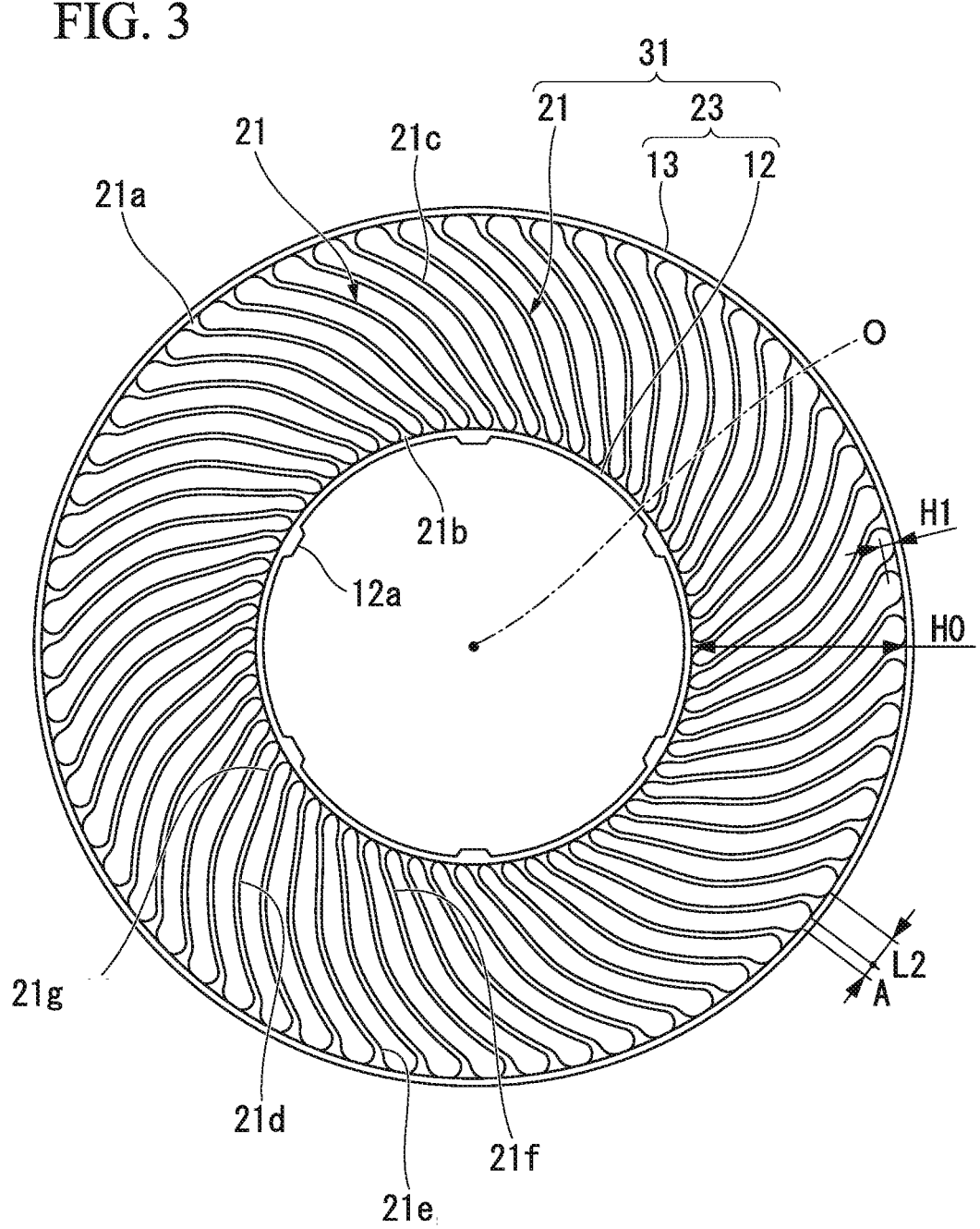
FIG. 3 is a side view of a first split case body of the non-pneumatic tire shown in FIG. 1 when seen from the first side in the tire width direction, or a side view of a second split case body when seen from a second side in the tire width direction.
Figure 4:
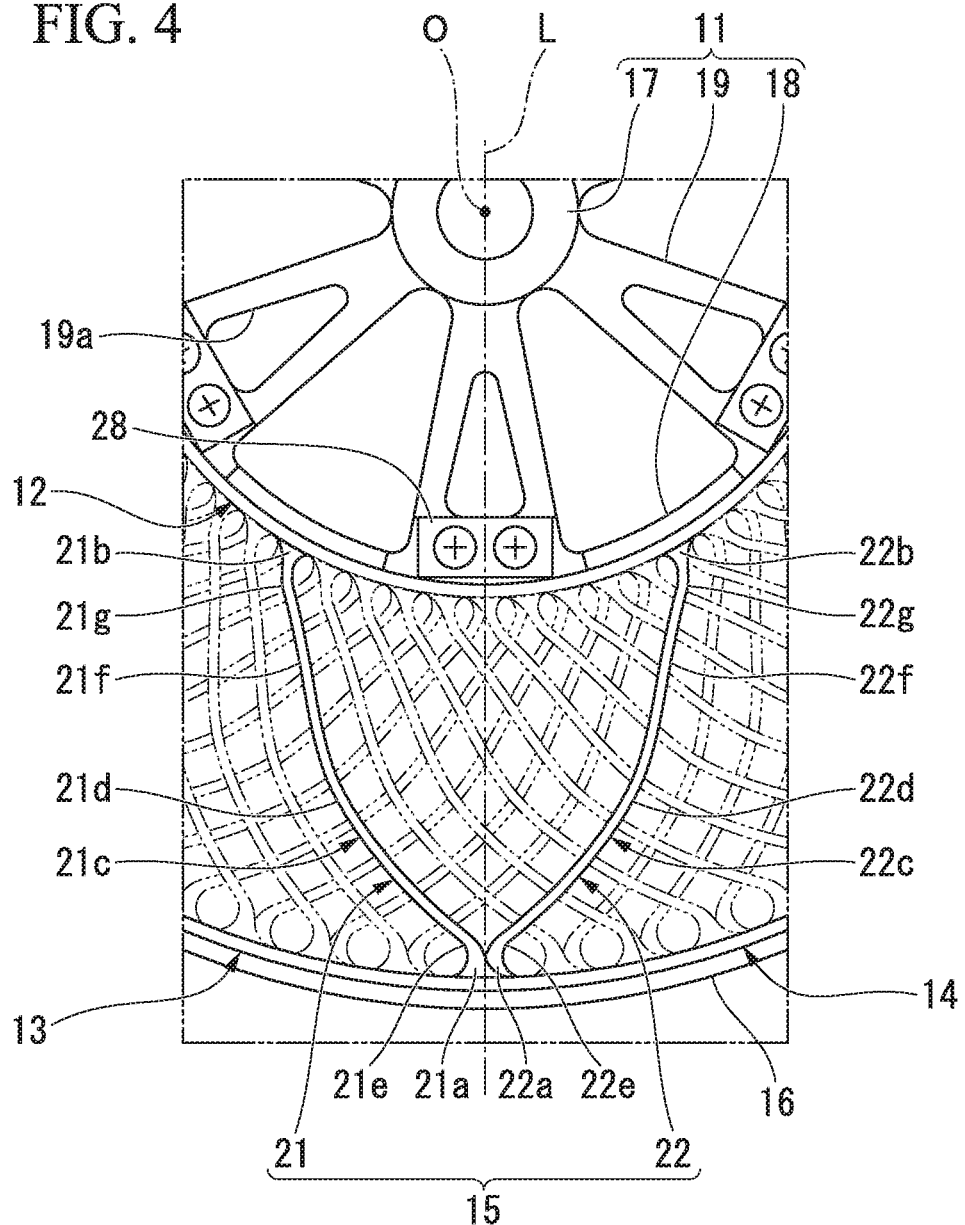
FIG. 4 is an enlarged view showing a major part of FIG. 2.

Here, as shown in FIGS. 2 to 4, in each of the first elastic connecting plates 21, first end portion 21a connected to the outer tubular body 13 is disposed closer to a first side in the tire circumferential direction than the second end portion 21b connected to the inner tubular body 12, and an intermediate portion 21c disposed between the first end portion 21a and the second end portion 21b extends from the first side toward the second side in the tire circumferential direction from the outside toward the inside in the tire radial direction. In addition, in each of the second elastic connecting plates 22, first end portion 22a connected to the outer tubular body 13 is disposed closer to the second side in the tire circumferential direction than the second end portion 22b connected to the inner tubular body 12, and an intermediate portion 22c disposed between the first end portion 22a and the second end portion 22b extends from the second side toward the first side in the tire circumferential direction from the outside toward the inside in the tire radial direction. The intermediate portions 21c and 22c are the entire portions of the first and second elastic connecting plates 21 and 22 except for the first end portions 21a and 22a and the second end portions 21b and 22b.

Further, intervals A in the tire circumferential direction are formed on the inner circumferential surface of the outer tubular body 13 between the first end portions 21a of the first elastic connecting plates 21 and the first end portions 22a of the second elastic connecting plates 22 neighboring in the tire circumferential direction.

In each of the connecting members 15, as shown in FIGS. 2 and 4, the first end portion 21a of the first elastic connecting plate 21 is shifted to the second side in the tire circumferential direction with respect to the first end portion 22a of the second elastic connecting plate 22. In the example shown, in one of the connecting members 15, parts of the first end portions 21a and 22a of the first and second elastic connecting plates 21 and 22 overlap each other when seen in the tire side view.

In addition, in the tire side view, the first end portion 21a of the first elastic connecting plate 21 in one of the connecting members 15 is separated at first side in the tire circumferential direction from the first end portion 22a of the second elastic connecting plate 22 of another connecting member 15 adjacent to the connecting members 15 at the second side in the tire circumferential direction.

Further, in one of the connecting members 15, positions in the tire circumferential direction of the first end portions 21a and 22a of the first and second elastic connecting plates 21 and 22 may coincide with each other, or in one of the connecting members 15, the first end portion 21a of the first elastic connecting plate 21 may be shifted to first side in the tire circumferential direction with respect to the first end portion 22a of the second elastic connecting plate 22. In addition, the first end portions 21a and 22a of the first and second elastic connecting plates 21 and 22 may be disposed to be shifted in the tire circumferential direction not to overlap each other in the tire side view.

Positions in the tire circumferential direction of the second end portion 21b of the first elastic connecting plate 21 in one of the connecting members 15 and the second end portion 22b of the second elastic connecting plate 22 of the other connecting member 15 coincide with each other. In the example shown, the second end portions 21b of the first elastic connecting plates 21 and the second end portions 22b of the second elastic connecting plates 22, which neighbor in the tire circumferential direction, continue on the outer circumferential surface of the inner tubular body 12 with substantially no gap therebetween.

A plurality of curved sections 21d to 21g and 22d to 22g curved in the tire circumferential direction are formed at the intermediate portions 21c and 22c of the first elastic connecting plate 21 and the second elastic connecting plate 22 in an extension direction in which the elastic connecting plates 21 and 22 extend in the tire side view when the tire 1 is seen in the tire width direction H. Further, the curved sections 21d to 21g and 22d to 22g are portions of the first and second elastic connecting plates 21 and 22 having curvatures in the tire side view, respectively.

In both of the elastic connecting plates 21 and 22, among the plurality of curved sections 21d to 21g and 22d to 22g, curve directions of the curved sections 21d to 21g and 22d to 22g neighboring in the extension direction are opposite to each other.

The plurality of curved sections 21d to 21g formed in the first elastic connecting plate 21 have a first curved section 21d curved to protrude toward the second side in the tire circumferential direction, a second curved section (a connecting portion) 21e configured to connect the first curved section 21d and the first end portion 21a and curved to protrude toward the first side in the tire circumferential direction, a third curved section 21f disposed between the first curved section 21d and the second end portion 21b and curved to protrude toward the first side in the tire circumferential direction, and a fourth curved section 21g configured to connect the third curved section 21f and the second end portion 21b and curved to protrude toward the second side in the tire circumferential direction.

The plurality of curved sections 22d to 22g formed in the second elastic connecting plate 22 have a first curved section 22d curved to protrude toward the first side in the tire circumferential direction, a second curved section (a connecting portion) 22e configured to connect the first curved section 22d and the first end portion 22a and curved to protrude toward the second side in the tire circumferential direction, a third curved section 22f disposed between the first curved section 22d and the second end portion 22b and curved to protrude toward the second side in the tire circumferential direction, and a fourth curved section 22g configured to connect the third curved section 22f and the second end portion 22b and curved to protrude toward the first side in the tire circumferential direction.

In the example shown, the first curved sections 21d and 22d have a radius of curvature in the tire side view larger than that of the second curved sections 21e and 22e, the third curved sections 21f and 22f, and the fourth curved sections 21g and 22g. Further, the first curved sections 21d and 22d are disposed at a central portion in the extension direction of the first elastic connecting plate 21 and the second elastic connecting plate 22.

Further, lengths of both of the elastic connecting plates 21 and 22 are equal to each other, and as shown in FIG. 4, the second end portions 21b and 22b of both of the elastic connecting plates 21 and 22 are connected to positions separated from the positions in the tire radial direction opposite to a central portion in the tire circumferential direction between the first end portions 21a and 22a on the outer circumferential surface of the inner tubular body 12 by the same angle (for example, 20° or more and 135° or less) at the first side and the second side in the tire circumferential direction about the axis O when seen in the tire side view. In addition, the first curved sections 21d and 22d, the second curved sections 21e and 22e, the third curved sections 21f and 22f and the fourth curved sections 21g and 22g of the first elastic connecting plate 21 and the second elastic connecting plate 22 protrude opposite to each other and have the same size in the tire circumferential direction.

Accordingly, as shown in FIG. 4, shapes of the connecting members 15 in the tire side view are line-symmetrical with respect to an imaginary line L connecting the axis O and the central portion in the tire circumferential direction of the connecting members 15 and extending in the tire radial direction.

Further, in the embodiment, both of circumferential end surfaces 26a, 26b, 27a and 27b directed in the tire circumferential direction among surfaces of the first end portions 21a and 22a of the first elastic connecting plate 21 and the second elastic connecting plate 22 extend in opposite directions in the tire circumferential direction to be separated from each other from the inside toward the outside in the tire radial direction. In addition, each of the first end portions 21a and 22a of the first and second elastic connecting plates 21 and 22 has a trapezoidal shape having a length in the tire circumferential direction that is increased from the inside toward the outside in the tire radial direction when seen in the tire side view.

Both of circumferential end surfaces directed in the tire circumferential direction among surfaces of the second end portions 21b and 22b of the first elastic connecting plate 21 and the second elastic connecting plate 22 extend in opposite directions in the tire circumferential direction to be separated from each other from the outside toward the inside in the tire radial direction. In addition, each of the second end portions 21b and 22b of the first and second elastic connecting plates 21 and 22 has a trapezoidal shape having a length in the tire circumferential direction increased from the outside toward the inside in the tire radial direction when seen in the tire side view.

In the example shown, both of the circumferential end surfaces of the second end portions 21b and 22b have a curved concave shape recessed in the tire circumferential direction when seen in the tire side view. Further, both of the circumferential end surface of the second end portions 21b and 22b may have a planar shape straightly extending in the tire side view or may have a multi-stage shape in which a plurality of planes continue.

Figure 5:
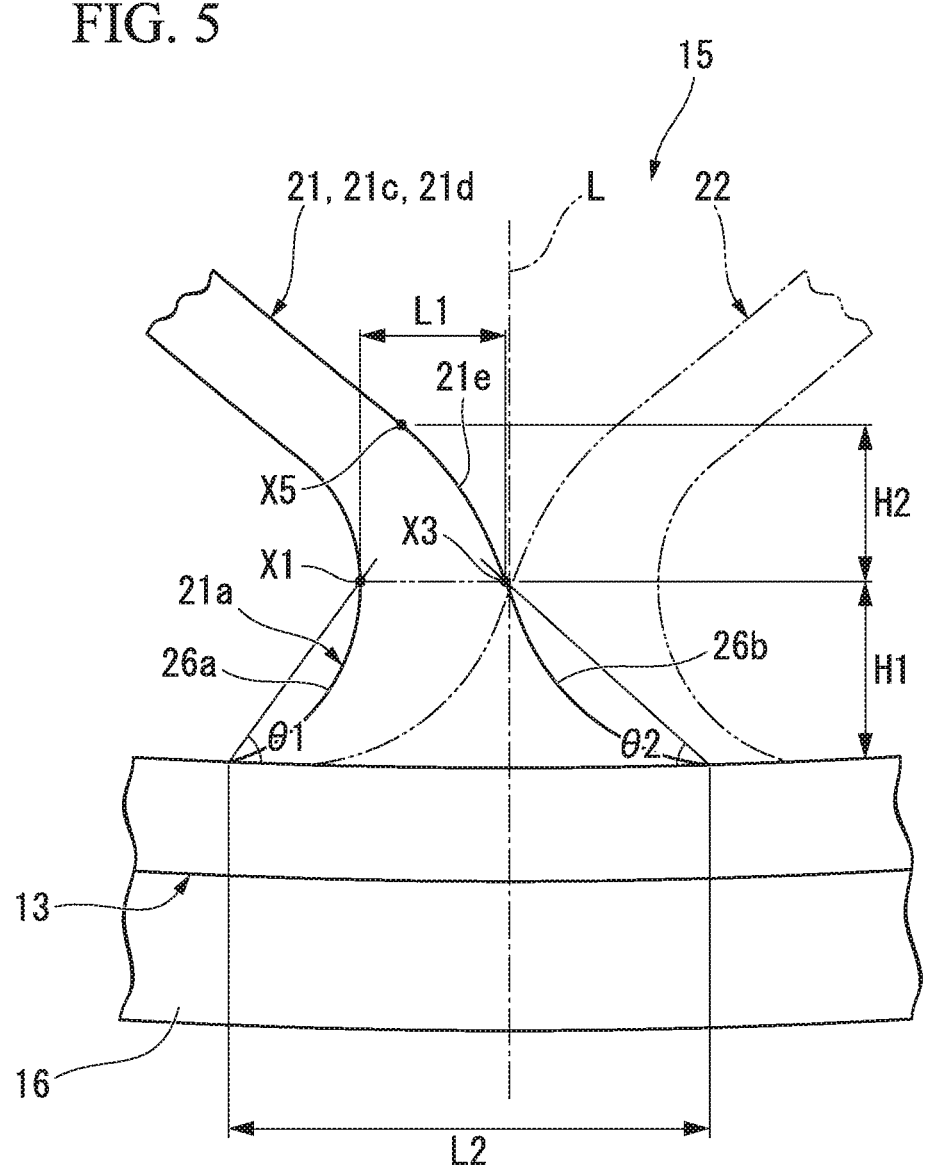
FIG. 5 is an enlarged view showing a first end portion side of a first elastic connecting plate of FIG. 4.
Figure 6:
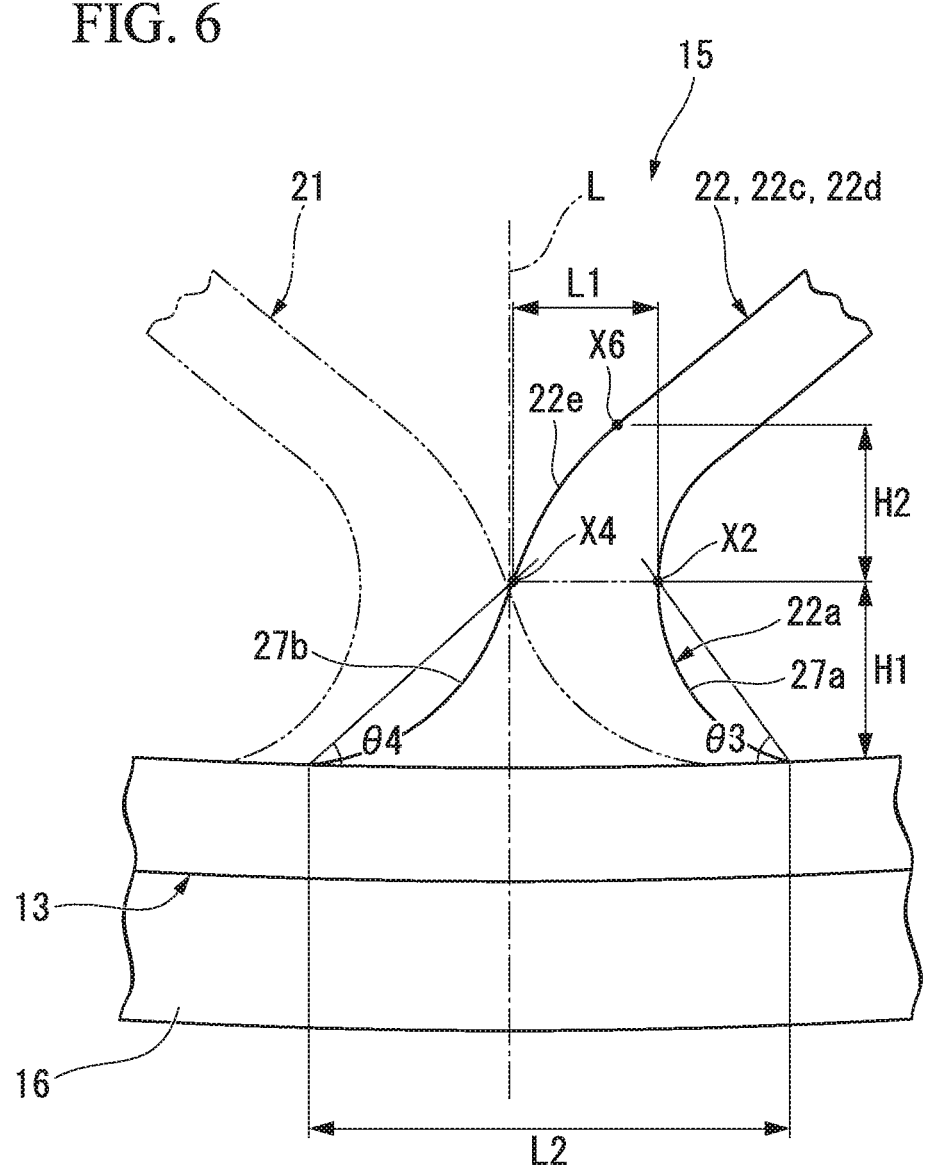
FIG. 6 is an enlarged view showing the first end portion side of a second elastic connecting plate of FIG. 4.

Here, as shown in FIG. 5, an inner end X1 in the tire radial direction of the circumferential end surface 26a of the second side directed to the second side in the tire circumferential direction among the surfaces of the first end portion 21a of the first elastic connecting plate 21 coincides with a portion disposed closest to first side in the tire circumferential direction in a surface directed to the second side in the tire circumferential direction among the surfaces of the first elastic connecting plate 21. In addition, as shown in FIG. 6, an inner end X2 in the tire radial direction at the circumferential end surface 27a of the first side directed to the first side in the tire circumferential direction among the surfaces of the first end portion 22a of the second elastic connecting plate 22 coincides with a portion disposed closest to the second side in the tire circumferential direction in a surface directed to the outside in the tire circumferential direction among the surfaces of the second elastic connecting plate 22.

Both of the circumferential end surfaces 26a, 26b, 27a and 27b in the first end portions 21a and 22a of the first elastic connecting plate 21 and the second elastic connecting plate 22 have a curved concave shape recessed in the tire circumferential direction when seen in the tire side view.

Here, as shown in FIG. 5, an inner end X3 in the tire radial direction of the circumferential end surface 26b of the first side directed to the first side in the tire circumferential direction among the surfaces of the first end portion 21a of the first elastic connecting plate 21 is disposed at an inflection point between a curved surface formed by the second curved section 21e and a curved surface formed by the circumferential end surface 26b of the first side on a surface directed to the first side in the tire circumferential direction among the surfaces of the first elastic connecting plate 21. In addition, as shown in FIG. 6, an inner end X4 in the tire radial direction of the circumferential end surface 27b of the second side directed to the second side in the tire circumferential direction among the surfaces of the first end portion 22a of the second elastic connecting plate 22 is disposed at an inflection point between a curved surface formed by the second curved section 22e and a curved surface formed by the circumferential end surface 27b of the second side in a surface directed toward the second side in the tire circumferential direction among the surfaces of the second elastic connecting plate 22.

All of the positions in the tire radial direction of the inner ends X1, X2, X3 and X4 in the tire radial direction of the circumferential end surfaces 26a, 26b, 27a and 27b of both of the first end portions 21a and 22a coincide with each other, and the positions are the inner ends in the tire radial direction of the first end portions 21a and 22a.

Here, each of a ratio of a circumferential length in the side view of the circumferential end surface 26a of the second side with respect to a circumferential length in the side view of the circumferential end surface 26b of the first side in the first elastic connecting plate 21 and a ratio of a circumferential length in the side view of the circumferential end surface 27a of the first side with respect to a circumferential length in the side view of the circumferential end surface 27b of the second side in the second elastic connecting plate 22 is larger than 0.5 and smaller than 2.0.

When each of the ratios is 0.5 or less, stress generated at a connecting portion between the circumferential end surface 26a of the second side of the first elastic connecting plate 21, the circumferential end surface 27a of the first side of the second elastic connecting plate 22 and the outer tubular body 13 does not easily decrease. In addition, when each of the ratios is 2.0 or more, stress generated at a connecting portion between the circumferential end surface 26b of the first side of the first elastic connecting plate 21, the circumferential end surface 27b of the second side of the second elastic connecting plate 22 and the outer tubular body 13 does not easily decrease.

Further, both of the circumferential end surfaces 26a, 26b, 27a and 27b of the first end portions 21a and 22a may have a planar shape straightly extending in the tire side view, or may have a multi-stage shape in which a plurality of planes continue.

In the example shown, in the first end portion 21a of the first elastic connecting plate 21, a rising angle θ1 of the circumferential end surface 26a of the second side with respect to the inner circumferential surface of the outer tubular body 13 is larger than a rising angle θ2 of the circumferential end surface 26b of the first side with respect to the inner circumferential surface of the outer tubular body 13. In addition, in the first end portion 22a of the second elastic connecting plate 22, a rising angle θ3 of the circumferential end surface 27a of the first side with respect to the inner circumferential surface of the outer tubular body 13 is larger than a rising angle θ4 of the circumferential end surface 27b of the second side with respect to the inner circumferential surface of the outer tubular body 13. The rising angle θ1 of the circumferential end surface 26a of the second side of the first elastic connecting plate 21 is equal to the rising angle θ3 of the circumferential end surface 27a of the first side of the second elastic connecting plate 22, and the rising angle θ2 of the circumferential end surface 26b of the first side of the first elastic connecting plate 21 is equal to the rising angle θ4 of the circumferential end surface 27b of the second side of the second elastic connecting plate 22.

Further, the rising angles θ1 to θ4 are angles formed at sides of the first end portions 21a and 22a by straight lines connecting the outer ends in the tire radial direction of the circumferential end surfaces 26a, 26b, 27a and 27b of the first end portions 21a and 22a and the inner ends X1, X2, X3 and X4 when seen in the tire side view and the inner circumferential surface of the outer tubular body 13.

In addition, as shown in FIG. 3, a size in the tire radial direction of each of the first end portions 21a and 22a (hereinafter referred to as a rising height) H1 is larger than 0.03 times and smaller than 0.15 times the distance in the tire radial direction between the inner circumferential surface of the outer tubular body 13 and the outer circumferential surface of the inner tubular body 12 (hereinafter referred to as the spoke height) H0. Further, for example, the rising height H1 is about 4.5 mm and the spoke height H0 is about 70 mm. In addition, when the rising height H1 is 0.03 times the spoke height H0 or less, the lengths of both of the circumferential end surfaces 26a, 26b, 27a and 27b of the first end portions 21a and 22a are hard to sufficiently secure, and stress generated in the connecting portion between the circumferential end surfaces 26a to 27b and the outer tubular body 13 cannot be easily distributed in the first end portions 21a and 22a in the tire radial direction. In addition, when the rising height H1 is 0.15 times the spoke height H0 or more, it is difficult to sufficiently secure lengths of the intermediate portions 21c and 22c, and when a compressive force in the tire radial direction is applied to the non-pneumatic tire 1, smooth elastic deformation of the first and second elastic connecting plates 21 and 22 is difficult.

In addition, as shown in FIGS. 5 and 6, a sum of a size in the tire radial direction of the second curved sections 21e and 22e (hereinafter referred to as a connecting height) H2 and the rising height H1 is larger than 0.05 times and smaller than 0.20 times the spoke height 110, and in the embodiment, for example, about 0.1157 times. When the sum is 0.05 times the spoke height H0 or less, it is difficult to smoothly connect the first end portions 21a and 22a and the intermediate portions 21c and 22c, and when a compressive force in the tire radial direction is applied to the non-pneumatic tire 1, stress can be easily concentrated on the connecting portion, the lengths of both of the circumferential end surfaces 26a, 26b, 27a and 27b of the first end portions 21a and 22a cannot be sufficiently secured easily, and stress generated in the connecting portion between the circumferential end surface 26a to 27b and the outer tubular body 13 cannot be easily distributed in the first end portions 21a and 22a in the tire radial direction. In addition, when the sum is 0.20 times the spoke height H0 or more, the lengths of the intermediate portions 21c and 22c cannot be sufficiently secured easily, and when a compressive force in the tire radial direction is applied to the non-pneumatic tire 1, it is smooth elastic deformation of the first and second elastic connecting plates 21 and 22 is difficult.

Further, the connecting height H2 is a distance in the tire radial direction between an inner end X5 in the tire radial direction of the circumferential end surface of the first side directed to the first side in the tire circumferential direction among the surfaces of the second curved section 21e and an inner end in the tire radial direction of the first end portion 21a in the first elastic connecting plate 21, and the distance in the tire radial direction between an inner end X6 in the tire radial direction of the circumferential end surface of the second side directed to the second side in the tire circumferential direction among the surfaces of the second curved section 22e and an inner end in the tire radial direction of the first end portion 22a in the second elastic connecting plate 22. The inner ends X5 and X6 are disposed at the same position in the tire radial direction and disposed at the connecting portions between the second curved sections 21e and 22e and between the first curved sections 21d and 22d.

In addition, the length in the tire circumferential direction (hereinafter referred to as a lower side length) L2 of each of the first end portions 21a and 22a on the inner circumferential surface of the outer tubular body 13 is larger than the interval A between the first end portions 21a and 22a neighboring in the tire circumferential direction on the inner circumferential surface of the outer tubular body 13. For example, the interval A is larger than 1/20 and smaller than 1/2 of the lower side length L2. Further, when the interval A is 1/20 of the lower side length L2 or less, the weight of the non-pneumatic tire is increased, and when the interval A is 1/2 of the lower side length L2 or more, the strength of the first end portions 21a and 22a cannot be easily secured. For example, the interval A is about 3.0 mm and the lower side length L2 is about 12.0 mm.

In addition, the lower side length L2 is larger than 2 times and smaller than 5 times the rising height H1.

In addition, as shown in FIGS. 5 and 6, the size L1 in the tire circumferential direction of the inner end in the tire radial direction of each of the first end portions 21a and 22a is larger than 1/5 and smaller than 1/2 of the lower side length L2, for example, about 4.0 mm.

Further, a radius of the outer circumferential surface of the outer tubular body 13 is, for example, about 150 mm.

Here, in the embodiment, the ring member 14 and the plurality of connecting members 15 are integrally formed of a synthetic resin material. Further, the synthetic resin material may be, for example, only one kind of resin material, a mixture including two or more kinds of resin materials, or a mixture including one or more kinds of resin materials and one or more kinds of elastomers, and further, for example, may include additives such as an antioxidant, a plasticizer, a filler, a pigment, or the like.

Further, in the embodiment, as shown in FIG. 1, the ring member 14 is split into one split ring member 23 disposed at first side in the tire width direction H and another split ring member 24 disposed at the second side in the tire width direction H. Further, in the example shown, the ring member 14 is split at the central portion in the tire width direction H.

Then, the one split ring member 23 is integrally formed with the first elastic connecting plate 21 and the other split ring member 24 is integrally formed with the second elastic connecting plate 22.

Further, in the embodiment, the one split ring member 23 and the first elastic connecting plate 21 are integrally formed by injection molding, as are the other split ring member 24 and the second elastic connecting plate 22.

Hereinafter, a unit in which the one split ring member 23 and the first elastic connecting plate 21 are integrally formed is referred to as a first split case body 31, and a unit in which the other split ring member 24 and the second elastic connecting plate 22 are integrally formed is referred to as a second split case body 32.

Here, the injection molding may be a general method of simultaneously forming the first and second split case bodies 31 and 32, insert molding in which one of the one and the other split ring members 23 and 24 as well as the first and second elastic connecting plates 21 and 22 of the first and second split case bodies 31 and 32 is formed as an insert part and the other is formed by injection molding, so-called two-color formation, or the like.

In addition, in each of the first and second split case bodies 31 and 32, the one and the other split ring members 23 and 24, and the first and second elastic connecting plates 21 and 22 may be formed of different materials or may be formed of the same material. Further, while the material may be a metal material, a resin material, or the like, a resin material, in particular a thermoplastic resin, is preferable from the viewpoint of reduction in weight.

In addition, when the first and second split case bodies 31 and 32 are simultaneously injection-molded as a whole, the plurality of protrusions 12a formed in the inner tubular body 12 may be a gate portion.

In each of the first and second split case bodies 31 and 32, the central portion in the tire width direction H of the first and second elastic connecting plates 21 and 22 and the central portion in the tire width direction H of the outer tubular body 13 coincide with each other, and the inner tubular body 12 has a smaller width than the outer tubular body 13.

Further, edges in the tire width direction H of the outer tubular body 13 of the one split ring member 23 and the outer tubular body 13 of the other split ring member 24 are connected by, for example, welding, fusion, adhesion, or the like. Further, among these, in the case of welding, for example, hot plate welding or the like may be employed.

In addition, edges in the tire width direction H of the inner tubular body 12 of the one split ring member 23 and the inner tubular body 12 of the other split ring member 24 are separated from each other in the tire width direction H. Accordingly, generation of burrs in the inner circumferential surface of the inner tubular body 12 fitted into the attachment body 11 is prevented.

In addition, the first split case body 31 and the second split case body 32 have the same shape and the same size as shown in FIG. 3 in a state before the first and second split case bodies 31 and 32 are connected as described above.

Then, in the connection as described above, the non-pneumatic tire 1 is obtained by matching and connecting the edges in the tire width direction H of the outer tubular bodies 13 of the first split case body 31 and the second split case body 32 such that the connecting members 15 are disposed line-symmetrically as described above in the tire side view, while positions in the tire circumferential direction of the first split case body 31 and the second split case body 32 are matched, in a state in which orientations in the tire width direction H of the split case bodies 31 and 32 are opposite to each other.

As described above, according to the non-pneumatic tire 1 of the embodiment, both of the circumferential end surfaces 26a, 26b, 27a and 27b of the first end portions 21a and 22a extend in opposite directions in the tire circumferential direction to be separated from each other from the inside toward the outside in the tire radial direction. For this reason, when a compressive force in the tire radial direction is applied to the non-pneumatic tire 1, stress generated in the connecting portions between the circumferential end surfaces 26a, 26b, 27a and 27b of the first end portions 21a and 22a and the outer tubular body 13 can be easily distributed in the first end portions 21a and 22a in the tire radial direction, and local concentration of stress on the connecting portion can be limited.

Accordingly, a ground pressure generated at a portion immediately under the connecting portion can be decreased in the ground plane of the non-pneumatic tire 1, and deviation of the ground pressure in the ground plane can be reduced.

As described above, for example, damage to the connecting portion and generation of vibrations, uneven wear, or the like, can be limited.

Further, both of the circumferential end surfaces 26a, 26b, 27a and 27b of the first end portions 21a and 22a extend as described above. For this reason, as the connecting lengths in the tire circumferential direction between the first end portions 21a and 22a and the outer tubular body 13 are lengthily secured, the ground pressure generated in the portion disposed immediately under the first end portions 21a and 22a can be distributed in the tire circumferential direction in the ground plane, and as described above, deviation of the ground pressure in the ground plane can be reliably reduced in cooperation with reduction in ground pressure generated in the portion disposed immediately under the connecting portion.

In addition, since the connecting lengths in the tire circumferential direction between the first end portions 21a and 22a and the outer tubular body 13 are lengthily secured and the ground pressure generated in the portion disposed immediately under the first end portions 21a and 22a cannot be easily distributed in the tire circumferential direction in the ground plane, provisionally, when the non-pneumatic tire 1 is mounted on a two-wheeled vehicle and camber input in the tire width direction H is performed, regardless of easy concentration of stress on the end portion in the tire width direction H of the connecting portion between the first end portions 21a and 22a and the outer tubular body 13, the stress can be distributed in the tire circumferential direction. Further, the non-pneumatic tire 1 is not limited to a two-wheeled vehicle but may be applied to various vehicles.

In addition, since all of the circumferential end surfaces 26a, 26b, 27a and 27b of the first end portions 21a and 22a extend as described above, the first end portions 21a and 22a can be prevented from being deformed to collapse in the tire circumferential direction, and the above-mentioned effect can be reliably exhibited.

In addition, the intermediate portion 21c of the first elastic connecting plate 21 extends from the first side toward the second side in the tire circumferential direction as it goes from the outside toward the inside in the tire radial direction, and further, the intermediate portion 22c of the second elastic connecting plate 22 extends from the second side toward the first side in the tire circumferential direction as it goes from the outside toward the inside in the tire radial direction. For this reason, when a compressive force in the tire radial direction is applied to the non-pneumatic tire 1, the first and second elastic connecting plates 21 and 22 can be smoothly elastically deformed with, for example, difficulty in buckling distortion or the like.

In addition, all of the circumferential end surfaces 26a, 26b, 27a and 27b of the first end portions 21a and 22a have a curved concave shape recessed in the tire circumferential direction when seen in the tire side view. For this reason, when a compressive force in the tire radial direction is applied to the non-pneumatic tire 1, stress generated in the connecting portions between all of the circumferential end surfaces 26a, 26b, 27a and 27b of the first end portions 21a and 22a and the outer tubular body 13 can be reliably distributed in the first end portions 21a and 22a in the tire radial direction.

In addition, the connecting portion of the intermediate portion 21c of the first elastic connecting plate 21 to the first end portion 21a is the second curved section 21e having a curved shape protruding toward the first side in the tire circumferential direction when seen in the tire side view, and further, the connecting portion of the intermediate portion 22c of the second elastic connecting plate 22 to the first end portion 22a is the second curved section 22e having a curved shape protruding toward the second side in the tire circumferential direction when seen in the tire side view. For this reason, the intermediate portions 21c and 22c and the first end portions 21a and 22a can be smoothly connected. Accordingly, concentration of stress on the second curved sections 21e and 22e can be limited, and the first end portions 21a and 22a can be more securely prevented from being deformed to collapse in the tire circumferential direction.

In addition, the lower side length L2 is larger than the interval A. For this reason, the ground pressure generated in the portion disposed immediately under the first end portions 21a and 22a can be securely distributed in the tire circumferential direction in the ground plane, and deviation of the ground pressure in the ground plane can be more reliably reduced.

In addition, the plurality of curved sections 21d to 21g and 22d to 22g are formed at the intermediate portions 21c and 22c. For this reason, flexibility can be provided in the first and second elastic connecting plates 21 and 22, and damage to the first and second elastic connecting plates 21 and 22 can be limited.

Further, the technical spirit of the present invention is not limited to the embodiment but various modifications may be made without departing from the spirit of the present invention.

For example, while a configuration in which the first elastic connecting plate 21 and the second elastic connecting plate 22 are provided at each of the connecting members 15 is shown in the embodiment, instead of this, a configuration in which the plurality of first elastic connecting plates 21 and the plurality of second elastic connecting plates 22 are provided at each of the connecting members 15 at different positions in the tire width direction H may be employed.

In addition, the plurality of connecting members 15 may be formed between the inner tubular body 12 and the outer tubular body 13 in the tire width direction H.

In addition, instead of the embodiment, for example, the second end portions 21b and 22b of the first elastic connecting plate 21 and the second elastic connecting plate 22 may be connected to positions opposite to each other on the outer circumferential surface of the inner tubular body 12 with the axis O interposed therebetween in the tire radial direction.

In addition, each of the connecting members 15 may have at least one of the first elastic connecting plate 21 and the second elastic connecting plate 22.

Further, a gap in the tire width direction H may not be formed between the inner tubular body 12 of the one split ring member 23 and the inner tubular body 12 of the other split ring member 24.

In addition, the ring member 14 may be split into three or more parts in the tire width direction H or may not be split.

In addition, the ring member 14 and the plurality of connecting members 15 may not be integrally formed.

Furthermore, the ring member 14 and the connecting members 15 are not limited to the embodiment. For example, the outer tubular body and the attachment body may be directly connected via the connecting members while allowing relative elastic deformation therebetween, without provision of the inner tubular body.

In addition, the curved sections 21d to 21g and 22d to 22g may not be formed at the intermediate portions 21c and 22c of the first and second elastic connecting plates 21 and 22.

In addition, for example, both of the circumferential end surfaces of the second end portions 21b and 22b of the first and second elastic connecting plates 21 and 22 may be appropriately varied to extend to be parallel to each other in the tire side view.

Additionally, the components of the above-mentioned embodiments may be appropriately substituted with known components and the above-mentioned variants may be appropriately combined without departing from the spirit of the present invention.

INDUSTRIAL APPLICABILITY

According to the present invention, reduction in weight can be achieved while suppressing a decrease in strength of the connecting member. In addition, according to the present invention, local concentration of stress on the connecting portion between the circumferential end surface of the first end portion of the elastic connecting plate and the outer tubular body can be limited, and deviation of the ground pressure in the ground plane can be reduced.

REFERENCE SIGNS LIST

1 Non-pneumatic tire
11 Attachment body
13 Outer tubular body
15 Connecting member
21 First elastic connecting plate (elastic connecting plate)
22 Second elastic connecting plate (elastic connecting plate)
21a, 22a First end portion
21b, 22b Second end portion
21c, 22c Intermediate portion
21d, 22d First curved section (curved section)
21e, 22e Second curved section (curved section, connecting portion)
21f, 22f Third curved section (curved section)
21g, 22g Fourth curved section (curved section)
26a, 26b, 27a, 27b Circumferential end surface of first end portion
H Tire width direction

The invention claimed is:

1. A non-pneumatic tire comprising:
an attachment body attachable to an axle;
an inner tubular body installed outside the attachment body in a tire radial direction;
an outer tubular body configured to surround the attachment body from the outside in a tire radial direction; and
a connecting member configured to connect the attachment body and the outer tubular body while allowing displacement therebetween,
wherein the connecting member comprises a plurality of elastic connecting plates in which first end portions of the elastic connecting plates connected to the outer tubular body are disposed closer to a first side in a tire circumferential direction than second end portions of the elastic connecting plates connected to the attachment body, and intermediate portions of the elastic connection plates are disposed between the first end portions and the second end portions, circumferential end surfaces directed in the tire circumferential direction of surfaces of the first end portions of the elastic connecting plates extend in opposite directions in the tire circumferential direction to be separated from each other from the inside toward the outside in the tire radial direction, the circumferential end surfaces of the first end portions of the elastic connecting plates have a curved concave shape recessed in the tire circumferential direction in a tire side view when the non-pneumatic tire is seen in a tire width direction, a rising angle θ1 of the circumferential end surface of a second side with respect to an inner circumferential surface of the outer tubular body is larger than a rising angle θ2 of the circumferential end surface of the first side with respect to the inner circumferential surface of the outer tubular body, wherein the rising angle is an angle formed at sides of the first end portions by (a) straight lines connecting outer ends in the tire radial direction of the circumferential end surfaces and inner ends in the tire radial direction of the circumferential end surfaces of the first end portions when seen in the tire side view and (b) the inner circumferential surface of the outer tubular body, wherein the inner ends coincide with each other in the tire radial direction, and positions in the tire radial direction of inner ends in the tire radial direction of the circumferential end surfaces of the first end portions coincide with each other, and the inner tubular body, the outer tubular body and the plurality of the elastic connecting plates are integrally formed of a thermoplastic elastomer or a thermoplastic resin.

2. The non-pneumatic tire according to claim 1, wherein connecting portions of the intermediate portions to the first end portions have a curved shape protruding toward the first side in the tire circumferential direction in the tire side view when the non-pneumatic tire is seen in the tire width direction.

3. The non-pneumatic tire according to claim 1, wherein the plurality of elastic connecting plates are disposed at intervals in the tire circumferential direction, and a length in the tire circumferential direction of the first end portions of the elastic connecting plates on an inner circumferential surface of the outer tubular body is larger than an interval between the first end portions of adjacent elastic connecting plates in the tire circumferential direction on the inner circumferential surface of the outer tubular body.

4. The non-pneumatic tire according to claim 1, wherein a plurality of curved sections curved in the tire circumferential direction are formed at the intermediate portions in an extension direction in which the elastic connecting plates extend in the tire side view when the non-pneumatic tire is seen in the tire width direction, and curve directions of the curved sections adjacent in the extension direction are opposite to each other.

* * * * *